United States Patent Office 3,387,919
Patented June 11, 1968

3,387,919
PROCESS FOR THE PRODUCTION OF HYDRAZINE
Hans-Joachim Abendroth, Leverkusen, and Günter Henrich, Opladen, Germany, assignors to Farbenfabriken Bayer Aktiengesellschaft, Leverkusen, Germany, a corporation of Germany
No Drawing. Filed Mar. 12, 1959, Ser. No. 798,843
Claims priority, application Germany, Mar. 17, 1958,
F 25,263
10 Claims. (Cl. 23—190)

It is known that hydrazine can be prepared from gaseous ammonia and chlorine in the presence of an inert gas such for example as nitrogen by producing in a first stage a mixture of chloramine and ammonia, which mixture is then converted in a second stage in an alkaline liquid such as aqueous sodium hydroxide solution, anhydrous or aqueous ammonia or an ammoniacal organic liquid, with excess ammonia to form hydrazine.

It is also known that it is possible to add a carbonyl compound such as an aldehyde or ketone to the second stage of the hydrazine formation in boiling sodium hydroxide solution, so that the aldehyde or ketone can react with hydrazine in aqueous solution to form an aldazine or ketazine boiling below 100° C. According to this known process, the ammonium chloride in the sodium hydroxide solution, which is primarily formed as a result of the reaction, is transformed into ammonia and common salt. This ammonia is withdrawn in gaseous form together with the excess reaction ammonia and the other volatile substances such as the azeotrope of ketazine or aldazine with water, nitrogen and excess azine formed, while in most cases the common salt is lost. This means, however, that under these circumstances, two mols of sodium hydroxide solution are used up in addition to each mol of the chlorine which is introduced.

The present invention is concerned with a process of producing hydrazine by reacting gaseous chlorine with excess gaseous ammonia in the presence of a carbonyl compound such as a ketone or aldehyde, the process consisting in that the mixture of excess ammonia and the corresponding ketone or aldehyde is caused to react with chlorine; ammonium chloride, ammonia, excess ketone or excess aldehyde is removed from the reaction mixture and the resulting reaction product is worked up to yield hydrazine.

It is surprising that under these conditions, even when using an excess of ketone or aldehyde, no ketazine or aldazine is formed. In actual fact, a compound is formed in a strongly exothermic reaction immediately on mixing the components in which one mol of acetone and one mol of hydrazine is found when this compound is worked up, whereas the hydrolysis of azines yields two mols of ketone or aldehyde in known manner. The above mentioned compound, however, is not the hydrazone normally to be expected from the molar ratio used, but is an isomer of this hydrazone which has considerably different physical and chemical properties therefrom.

Thus, for example, when using acetone there is formed a product which agrees as regards the empirical composition ($C_3H_8N_2$) and molecular weight (72) with the known acetone hydrazone to be expected. This compound however, melts at +40° C., that is 70° C. higher than the acetone hydrazone. Moreover, in contrast with normal hydrazone, the isohydrazone has a very surprising power of oxidation. For example, in aqueous acid solution each mol oxidises two mols of hydrogen iodide to elementary iodine, the two nitrogen atoms of the isohydrazone yielding ammonia.

The structure of these isohydrazones probably contains a diaziridine ring, and the acetone isohydrazone should consequently be interpreted as C,C-dimethyl diaziridine

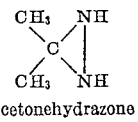  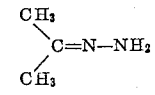

i-Acetonehydrazone  n-Acetonehydrazone

The isohydrazones, like normal hydrazones, can be easily split by heating with mineral acids into ketone or aldehyde and hydrazine salt.

Using the process of the present invention, the introduction of the reaction mixture into sodium hydroxide solution to form the hydrazine as the corresponding aldazine or ketazine is superfluous. This introduction is associated with the aforementioned disadvantages, and thus an important economic advantage is achieved by comparison with the known process.

The molar ratio between ketone or aldehyde and chlorine should not be substantially below the value 2 to 1, while no special upper limit is necessary. It is advantageous to work in a molar ratio of between 2 and 5 to one. By selecting the relevant ketone or aldehyde, it is not necessary with the present process (by contrast with the known processes) to keep to such compounds which form with hydrazine an azine boiling from aqueous solution below 100° C., as it is possible in addition to use all those aldehydes or ketones which are volatile without decomposition in vacuo at the highest reaction temperatures used. As carbonyl compounds coming into consideration the following may be mentioned by way of example: acetone, methylethylketone, diethylketone, methylisopropylketone, ethylpropylketone, methylbutylketone, cyclohexanone, acetaldehyde, propionaldehyde, butyraldehyde and benzaldehyde.

When selecting the molar ratio between ammonia and chlorine, care should be taken that the isohydrazone formed, corresponding to its partial pressure, is volatile at the reaction temperature which is used; it is advantageous to work with a molar ratio of 30 to 60 mols of ammonia per mol of chlorine.

The reaction temperature is kept at about 60 to about 100° C. to achieve the best possible results, although it is also possible to work at lower or higher temperatures. Since a strongly exothermic reaction takes place, this temperature can be maintained without any energy consumption. The maintenance of the best possible working temperature is facilitated by diluting the reaction mixture with an inert gas, preferably nitrogen.

It has also been found to be advantageous, without reducing the yield, to add the inert gas serving for dilution purposes to the ammonia and not to the chlorine as was the case with the known process. The result then obtained is that the gas mixture resulting from the reaction can be immediately introduced into the synthesis process again after separating out the desired isohydrazone and ammonium chloride, whereas with the prior processes, a quite complicated separation of the ammonia from the inert gas, for example by liquefaction of the ammonia is necessary.

The quantity of the inert gas serving for dilution purpose and admixed with the ammonia is about 0.5 to 2 mols, preferably 1 mol per mol of ammonia.

It is very advantageous to allow the reaction to proceed in the required direction under reduced pressure; it is advantageous to use pressure from 0.1 to 0.3 atm. gauge. In this manner, the corresponding isohydrazone is immediately obtained in a good yield without appreciable reaction time and without any energy consumption. Consequently, there is not only a marked decrease in the consumption of sodium hydroxide solution, but the chlorine introduced is also recovered in the form of ammonium chloride as an industrially useful by-product. In the known process, the product was obtained first of all in the boiling sodium hydroxide and it was necessary for known catalysts such as glue to be added to this solution to suppress disturbing reactions.

An additional technical, and at the same time economic advantage, of the process according to the invention is that the required isohydrazone is obtained immediately as the monohydrate and not in the form of an aqueous distillate, as in the known process, so that it is not necessary to distil the ketazine or aldazine from the aqueous solution with the concurrent evaporation of about 25 to 30 mols of water per mol of ketazine or aldazine.

Moreover the gaseous isohydrazone formed is accompanied only by components from which it can be separated easily because of its different state of aggregation (as in the case of ammonium chloride in powder form) or on account of the very different boiling points (such as ammonia and possibly nitrogen). The separation of the ammonium chloride can be carried out for example by filtering it off from the gas mixture by means of a dust separator, advantageously an electrical dust separator. Another method of isolation is to wash out all the reaction mixture with a boiling and preferably aqueous, substantially saturated, solution of ammonia chloride, which is circulated in the process, the ammonium chloride introduced being removed therefrom by filtration after suitable cooling. It is readily possible to isolate the isohydrazone from the gas mixture obtained in this way, it being possible to utilize its easier condensability or better solubility. For example, on account of the unusually good water solubility of the lower isohydrazones, they can be separated conveniently from ammonia and the ketone or aldehyde and if necessary from inert gas by washing with water or aqueous ammonia solution followed by subsequent boiling out of the ammonia and dissolved ketone or aldehyde. By treating the aqueous solution obtained with an acid, such as sulfuric acid, hydrochloric acid, the hydrazine can be separated from the solution in form of a salt.

Example 1

100 mol/hour of ammonia are combined with 5 mol/hour of acetone vapour and this gas mixture is caused to react with 2 mol/hour of gaseous chlorine. At the same time, a pressure of 0.3 atm. is maintained in the reaction chamber. Under these conditions a reaction temperature of 85° to 90° C. is maintained. During the reaction mols/hour of ammonium chloride, 1.5 mols/hour of acetone isohydrazone and 1.5 mols/hour of water are formed. After separation of the ammonium chloride by dust filtration the gas mixture is cooled to —10° C. Hereby acetone isohydrazone and water liquefy, while ammonia and acetone remain in the residual gas. The aqueous solution is treated with 0.7 mol/hour of sulfuric acid whereby 0.75 mol/hour of dihydrazine sulfate are formed, corresponding to a yield of 75% calculated on the amount of chlorine used.

Example 2

A mixture of 100 mol/hour of ammonia and 4.5 mol/hour of cyclohexanone are caused to react with 2 mol/hour of gaseous chlorine in a reaction chamber at 95° C. under a pressure of 0.15 atm. gauge. In a manner analogous to Example 1, 1.6 mols/hour of hydrazine monohydrochloride, corresponding to a yield of 80%, is obtained therefrom by treating with hydrochloric acid after separating out the ammonium chloride and condensing the isocyclohexanone hydrazone.

Example 3

75 mol/hour of ammonia are combined with 75 mol/hour of nitrogen and 7 mol/hour of acetone vapour and this gas mixture is caused to react at normal pressure with 2 mol/hour of gaseous chlorine. Under these conditions a reaction temperature of 70° to 80° C. is obtained. The reaction mixture freed by filtration from 2 mol/hour of ammonium chloride is washed with cold water. After boiling the ammonia and excess acetone, 1.3 mol/hour of isoacetone hydrazone are obtained as a substantially 20% solution. It is possible, for example by treating with sulphuric acid, to recover 0.65 mol/hour of dihydrazine sulphate, corresponding to a yield of 65%, based on the chlorine introduced. If methylethylketone is used instead of acetone, a yield of 44.2% is obtained, while methylisopropylketone gives a yield of 39.3% under equal conditions.

Example 4

100 mols/hour of ammonia are mixed with 100 mols/hour of nitrogen and 10 mols/hour of acetaldehyde, the mixture is reacted with 2 mols/hour of gaseous chlorine. A reaction temperature of about 100° C. is reached under the conditions per se. When working up the reaction mixture in the same manner as described in Example 3, 0.11 mol/hour of dihydrazine sulfate is obtained, corresponding to a yield of 11%.

What we claim is:

1. A process which comprises reacting in the gas phase a carbonyl compound selected from the group consisting of acetone, methylethylketone, diethylketone, methylisopropylketone, ethylpropylketone, methylbutylketone, cyclohexanone, acetaldehyde, propionaldehyde, butyraldehyde and benzaldehyde with gaseous chlorine and an excess of gaseous ammonia and recovering the isohydrazone formed.

2. Process as claimed in claim 1 in which the process is effected at a temperature of about 60 to about 100° C. and at a pressure of between about 0.1 atm. and 1 atm.

3. Process as claimed in claim 1, in which about 30 to 60 mols of ammonia are reacted with the one mol of chlorine and about 2 to 5 mols of said carbonyl group containing compound.

4. Process as claimed in claim 1 in which the ammonia is diluted by an inert gas.

5. Process as claimed in claim 1 in which the ammonium chloride is removed from the resulting reaction mixture by filtration, the remaining reaction is cooled to about —10° C., whereby an aqueous solution containing the isohydrazone of the compound is recovered.

6. Process as claimed in claim 1, in which the ammonium chloride is removed from the resulting reaction mixture by filtration, the remaining gas mixture is treated with water, whereby an aqueous solution containing the isohydrazone of the compound, ammonia and unreacted carbonyl group containing compound, is obtained, heating the solution to boiling until ammonia and the carbonyl compound are volatilized and recovering an aqueous solution of the isohydrazone of the carbonyl compound.

7. A process according to claim 2 wherein the reaction is effected at a pressure of about 0.1 and 0.3 atmospheres.

8. A process which comprises reacting in the gas phase a carbonyl compound selected from the group consisting of acetone, methylethylketone, diethylketone, methylisopropylketone, ethylpropylketone, methylbutylketone, cyclohexanone, acetaldehyde, propionaldehyde, butyraldehyde, and benzaldehyde with gaseous chlorine and an excess of gaseous ammonia, thereafter hydrolyzing an aqueous solution of the recovered isohydrazone and recovering the hydrazine formed.

9. A process according to claim 8, which comprises effecting said hydrolysis in the presence of a mineral acid and recovering the hydrazine in the form of its salt.

10. A compound of the formula

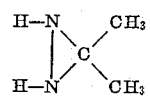

(References on following page)

References Cited

Grosskinsky et al., German application 1,019,647, Nov. 21, 1957, (Kl. 12i 30), pp. 23–190.

Audrieth, The Chemistry of Hydrazine, p. 24 (1951), John Wiley & Sons, N.Y.

Gilbert, J. Am. Chem. Soc., vol. 51, pp. 3394 to 3399 (1929).

Beilstein, Handbuch der Org. Chemie, Band 23, pp. 1, 2 (1936), System 3458–60.

Sidgwick, Organic Chemistry of Nitrogen, pp. 180 and 350–361 (1937).

ALTON D. ROLLINS, *Primary Examiner*.

IRVING MARCUS, D. McCUTCHEN, WALTER A. MODANCE, *Examiners*.

J. E. PHILLIPS, J. T. MILLER, *Assistant Examiners*.

UNITED STATES PATENT OFFICE
CERTIFICATE OF CORRECTION

Patent No. 3,387,919                                June 11, 1968

Hans-Joachim Abendroth    et al.

It is certified that error appears in the above identified patent and that said Letters Patent are hereby corrected as shown below:

Column 3, line 50, after "reaction" insert -- 4 --. Column 4, line 44, after "reaction" insert -- mixture --.

Signed and sealed this 2nd day of December 1969.

(SEAL)
Attest:

Edward M. Fletcher, Jr.                      WILLIAM E. SCHUYLER, JR.
Attesting Officer                              Commissioner of Patents